US010154054B2

(12) United States Patent
Thakurta et al.

(10) Patent No.: US 10,154,054 B2
(45) Date of Patent: *Dec. 11, 2018

(54) EMOJI FREQUENCY DETECTION AND DEEP LINK FREQUENCY

(71) Applicant: Apple Inc., Cupertino, CA (US)

(72) Inventors: Abhradeep Guha Thakurta, San Jose, CA (US); Andrew H. Vyrros, San Francisco, CA (US); Umesh S. Vaishampayan, Santa Clara, CA (US); Gaurav Kapoor, Santa Clara, CA (US); Julien Freudinger, Mountain View, CA (US); Vipul Ved Prakash, San Francisco, CA (US); Arnaud Legendre, San Fracisco, CA (US); Steven Duplinsky, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/640,266

(22) Filed: Jun. 30, 2017

(65) Prior Publication Data

US 2017/0359364 A1   Dec. 14, 2017

Related U.S. Application Data

(63) Continuation of application No. 15/275,358, filed on Sep. 24, 2016, now Pat. No. 9,712,550.
(Continued)

(51) Int. Cl.
*H04L 29/06* (2006.01)
*G06F 17/27* (2006.01)
(Continued)

(52) U.S. Cl.
CPC ...... *H04L 63/1425* (2013.01); *G06F 17/2235* (2013.01); *G06F 17/2735* (2013.01);
(Continued)

(58) Field of Classification Search
CPC ............. H04L 63/1425; H04L 63/0421; G06F 17/2735; G06F 17/2235; G06F 21/6254; G06F 17/276; G06N 99/005
See application file for complete search history.

(56) References Cited

U.S. PATENT DOCUMENTS

2003/0053622 A1   3/2003 Bruen et al.
2011/0064221 A1   3/2011 McSherry et al.
(Continued)

OTHER PUBLICATIONS

Chao Li and Gerome Miklau. "An Adaptive Mechanism for Accurate Query Answering under Differential Privacy." Proc. VLDB Endowment, pp. 514-525, Feb. 2012.
(Continued)

*Primary Examiner* — Darren B Schwartz
(74) *Attorney, Agent, or Firm* — Jaffery Watson Mendonsa & Hamilton LLP

(57) ABSTRACT

Systems and methods are disclosed for generating term frequencies of known terms based on crowdsourced differentially private sketches of the known terms. An asset catalog can be updated with new frequency counts for known terms based on the crowdsourced differentially private sketches. Known terms can have a classification. A client device can maintain a privacy budget for each classification of known terms. Classifications can include emojis, deep links, locations, finance terms, and health terms, etc. A privacy budget ensures that a client does not transmit too much information to a term frequency server, thereby compromising the privacy of the client device.

8 Claims, 10 Drawing Sheets

Related U.S. Application Data

(60) Provisional application No. 62/348,992, filed on Jun. 12, 2016, provisional application No. 62/371,659, filed on Aug. 5, 2016.

(51) Int. Cl.
   *G06F 17/22* (2006.01)
   *G06F 21/62* (2013.01)
   *G06N 99/00* (2010.01)

(52) U.S. Cl.
   CPC ....... *G06F 21/6254* (2013.01); *G06N 99/005* (2013.01); *G06F 17/276* (2013.01); *H04L 63/0421* (2013.01)

(56) References Cited

U.S. PATENT DOCUMENTS

| | | |
|---|---|---|
| 2011/0208763 A1 | 8/2011 | McSherry et al. |
| 2012/0143922 A1 | 6/2012 | Rane et al. |
| 2012/0204026 A1 | 8/2012 | Shi et al. |
| 2012/0296898 A1 | 11/2012 | Cormode et al. |
| 2012/0316956 A1 | 12/2012 | Nath et al. |
| 2013/0145473 A1 | 6/2013 | Cormode et al. |
| 2013/0212690 A1 | 8/2013 | Farwaz et al. |
| 2014/0196151 A1 | 7/2014 | Mishra et al. |
| 2014/0281572 A1 | 9/2014 | Wang et al. |
| 2014/0283091 A1 | 9/2014 | Zhang et al. |
| 2015/0293923 A1 | 10/2015 | Eide et al. |
| 2015/0339493 A1 | 11/2015 | Ioannidis et al. |
| 2015/0371059 A1 | 12/2015 | Bilogrevic et al. |
| 2016/0071170 A1 | 3/2016 | Massoulie et al. |
| 2016/0203333 A1 | 7/2016 | Fawaz et al. |

OTHER PUBLICATIONS

I. Roy, S. Setty, A. Kilzer, V. Shmatikov, E. Witchel. "Airavat: Security and Privacy for MapReduce." NSDI, 2010.
Cynthia Dwork and Aaron Roth. "The Algorithmic Foundations of Differential Privacy." Foundations and Trends in Theoretical Computer Science, vol. 9, Nos. 3-4, Aug. 2014.
Fanti, G., Pihur, V. and Erlingsson, Ú. "Building a RAPPOR with the Unknown: Privacy-Preserving Learning of Associations and Data Dictionaries." Proceedings on Privacy Enhancing Technologies. vol. 2016, Issue 3, pp. 41-61.
Dwork, C., McSherry, F., Nissim, K., Smith, A. "Calibrating Noise to Sensitivity in Private Data Analysis." Theory of Cryptography. TCC 2006. Lecture Notes in Computer Science, vol. 3876. Springer, Berlin, Heidelberg.
Vadhan, Sall!. "The Complexity of Differential Privacy." Center for Research on Computation & Society John A. Paulson School of Engineering & Applied Sciences Harvard University, Aug. 9, 2016.
Chaudhuri, S., Kaushik, R. and Ramamurthy, R. "Database Access Control & Privacy: Is There A Common Ground?" In: Proceedings of CIDR 2011, pp. 96-103 (2011).
Liu, C., Chakraborty, S. and Mittal, P. "Dependence makes you Vulnerable: Differential Privacy under Dependent Tuples. "NDSS '16, Feb. 21-24, 2016.
Ding, B., Winslett, M., Han, J., & Li, Z. "Differentially Private Data Cubes: Optimizing Noise Sources and Consistency." In Proceedings of SIGMOD 2011 and PODS 2011,2011, pp. 217-228.
Mohammed, N., Chen, R., Fung, B., and Yu, P. "Differentially Private Data Release for Data Mining." KDD'11, Aug. 21-24, 2011, pp. 493-501.
J. Hsu, M. Gaboardi, A. Haeberlen, S. Khanna, A. Narayan, B.C. Pierce, and A. Roth. "Differential Privacy: An Economic Method for Choosing Epsilon." Proc. of CSF 2014.
Ebadi, H., Sands, D. Schneider, G. "Differential Privacy: Now it's Getting Personal." In: POPL 2015, ACM, 2015, pp. 69-81.
Xueyang Hu, et al. "Differential Privacy in Telco Big Data Platform." Proceedings of the VLDB Endowment, 8(12): 1692-1703, 2015.

Alvin, M.S., et al. "Differential Privacy: On the Trade-off between Utility and Information Leakage." Proceedings of the 8th International Workshop on Formal Aspects of Security & Trust (FAST'11), Springer, LNCS 7140, 2011.
Haeberlen, Andreas, et al. "Differential Privacy Under Fire." In USENIX'11, 2011.
Narayan, Arjun. "Distributed Differential Privacy and Applications." Presented to the Faculties of the University of Pennsylvania, 2015.
Ning Zhang, Ming Li, and Wenjing Lou. "Distributed Data Mining with Differential Privacy." In IEEE International Conference on Communications, 2011.
Narayan, Arjun Ravi, "Distributed Differential Privacy and Applications." Publicly Accessible Penn Dissertations, Jan. 1, 2015.
Hamid Ebadi and David Sands. "Featherweight PINQ." CoRR, 2015.
Mohan, Prashanth. "GUPT: Privacy Preserving Data Analysis made Easy," Proceedings of the 2012 ACM SIGMOD International Conference on Management of Data, May 20-24, 2012.
Akkus, I. et al. "Non-tracking Web Analytics." CCS'12, ACM, Oct. 16-18, 2012.
Lee, Sangmin, et al. "Box: A Platform for Privacy-Preserving Apps." In 1 0th USENIX Symposium on Networked Systems Design and Implementation (NSDI '13),2013.
R. A. Popa, et al. "Privacy and Accountability for Location-based Aggregate Statistics." In Proceedings of the 18th ACM Conference on Computer and Communications Security, Oct. 17-21, 2011.
Kandappu, Thivya, et al. "Privacy in Crowdsourced Platforms." Springer International Publishing: Privacy in a Digital, Networked World. 2015, pp. 57-84.
Roy, S. Setty, A. Kilzer, V. Shmatikov, E. Witchel. "Airavat: Security and Privacy for MapReduce." NSDI, 2010.
Fanti, G., Pihur, V. and Erlingsson, Li. "Building a RAPPOR with the Unknown: Privacy-Preserving Learning of Associations and Data Dictionaries." Proceedings on Privacy Enhancing Technologies. vol. 2016, Issue 3, pp. 11-61.
Dwork, C., McSherry, F., Nissim, K., Smith, A. "Calibrating Noise to Sensitivity in Private Data Analysis." Theory of :; ryptography. TCC 2006. Lecture Notes in Computer Science, vol. 3876. Springer, Berlin, Heidelberg.
Vadhan, Salil. "The Complexity of Differential Privacy." Center for Research on Computation & Society John A. Paulson School of Engineering & Applied Sciences Harvard University, Aug. 9, 2016.
Liu, C., Chakraborty, S. and Mittal, P. "Dependence makes you Vulnerable: Differential Privacy under Dependent Tuples."NOSS '16, Feb. 21-24, 2016.
J. Hsu, M. Gaboardi, A. Haeberlen, S. Khanna, A. Narayan, B.C. Pierce, and A. Roth. "Differential Privacy: An Economic Method for Choosing Epsilon." Proc. of CSF 2014.
Ebadi, H., Sands, D. Schneider, G. "Differential Privacy: Now it's Gelling Personal." In: POPL 2015, ACM, 2015, pp. 59-81.
Kueyang Hu, et al. "Differential Privacy in Telco Big Data Platform." Proceedings of the VLDB Endowment, 8(12): 1692-1703, 2015.
Alvin, M.S., et al. "Differential Privacy: On the Trade—Off between Utility and Information Leakage." Proceedings of the 8th International Workshop on Formal Aspects of Security & Trust (FAST11 ), Springer, LNCS 7140, 2011.
Hamid Ebadi and David Sands. "Featherweight PINO." CoRR, 2015.
Ikkus, I. et al. "Non-tracking Web Analytics." CCS'12, ACM, Oct. 16-18, 2012.
Lee, Sangmin, et al. "[pi]box: A Platform for Privacy-Preserving Apps." In 1 0th USENIX Symposium on Networked Systems Design and Implementation (NSDI '13),2013.
Kandappu, Thivya, et al. "Privacy in Crowdsourced Platforms." Springer International Publishing: Privacy in a Digital, Networked Wo?d. 2015, pp. 57-84.
Apple Inc. IOS Security Guide—Mar. 2017.
J. M. Abowd. The Challenge of Scientific Reproducibility and Privacy Protection for Statistical Agen-cies. https://www2.census.gov/cac/sac/meetings/2016-09/2016-abowd.pdf, Sep. 15, 2016. Census Scientific Advisory Committee.

(56) References Cited

OTHER PUBLICATIONS

R. Bassily and A. Smith. Local, Private, Efficient Protocols for Succinct Histograms. In STOC, 2015.

G. Cormode and S. Muthukrishnan. An improved data stream summary: The count-min sketch and its applications. J. Algorithims, 55(1):58-75, Apr. 2005.

J. C. Duchi, M. Jordan, M. J. Wainwright, et al. Local Privacy and Statistical Minimax Rates. In FOCS. IEEE, 2013.

C. Dwork, M. Naor, T. Pitassi, and G. N. Rothblum. Differential privacy under continual observation. In Proceedings of the Forty-second ACM Symposium on Theory of Computing, STOC '10, pp. 715-724, New York, NY, USA, 2010. ACM.

Ú. Erlingsson, V. Pihur, and A. Korolova. RAPPOR: Randomized Aggregatable Privacy-Preserving Ordinal Response. In ACM CCS, 2014.

M.Gaboardi,J.Honaker,G.King,K.Nissim,J.Ullman,S.Vadhan,andJ. Murtagh.PSI($\Psi$):a Private data Sharing Interface. In Theory and Practice of Differential Privacy, 2016.

J. Hsu, S. Khanna, and A. Roth. Distributed Private Heavy Hitters. In ICALP. 2012.

S. P. Kasiviswanathan, H. K. Lee, K. Nissim, S. Raskhodnikova, and A. Smith. What Can We Learn Privately? SIAM Journal on Computing, 40(3):793-826, 2011.

A. Machanavajjhala, D. Kifer, J. Abowd, J. Gehrke, and L. Vilhuber. Privacy: Theory Meets Practice on the Map. In Proceedings of the 2008 IEEE 24th International Conference on Data Engineering, ICDE '08, pp. 277-286, Washington, DC, USA, 2008. IEEE Computer Society.

F. D. McSherry. Privacy integrated queries: An extensible platform for privacy-preserving data anal-ysis. In Proceedings of the 2009 ACM SIGMOD International Conference on Management of Data, SIGMOD '09, pp. 19-30, New York, NY, USA, 2009.

N. Mishra and M. Sandler. Privacy via Pseudorandom Sketches. In PODS, 2006.

Z. Qin, Y. Yang, T. Yu, I. Khalil, X. Xiao, and K. Ren. Heavy hitter estimation over set-valued data with local differential privacy. In Proceedings of the 2016 ACM SIGSAC Conference on Computer and Communications Security, CCS '16, pp. 192-203, New York, NY, USA, 2016.

EMOJI FREQUENCY DETECTION AND DEEP LINK FREQUENCY

RELATED APPLICATIONS

This application is a continuation application of co-pending U.S. patent application Ser. No. 15/275,358, filed Sep. 24, 2016, which claims priority under 35 U.S.C. § 119(e) of U.S. Patent Application No. 62/348,992, filed Jun. 12, 2016, and entitled, "EMOJI FREQUENCY DETECTION AND DEEP LINK FREQUENCY," and U.S. Patent Application No. 62/371,659, filed Aug. 5, 2016, and entitled "EMOJI FREQUENCY DETECTION AND DEEP LINK FREQUENCY," which is incorporated herein by reference to the extent that it is consistent with this disclosure.

This application is related to U.S. patent application Ser. No. 15/275,360, filed on Sep. 24, 2016, entitled "EMOJI FREQUENCY DETECTION AND DEEP LINK FREQUENCY," which is incorporated herein by reference to the extent that it is consistent with this disclosure.

TECHNICAL FIELD

This disclosure relates to the field of learning frequency of known terms used by a client device.

BACKGROUND

A user of a client device relies on one or more dictionaries of words for spell checking, suggesting words during typing, and other uses of known words. When suggesting words, emojis, deep links, and other terms to a user, the user would often like the most frequently used terms to be presented toward the top of a list of such suggestions. In the prior art, dictionaries typically use a fixed ordering of terms suggestions. If ordering is changed at all based on usage, the ordering of suggestions is based on only the local usage on a client of terms.

Current servers can learn the frequency of the words that users type by examining the clear text that a large plurality of users have typed that is received by a server ("crowd-sourced data"). For example, some text message services and email services (collectively, messages) receive messages in clear text and the servers can analyze the messages. Applications that run on a client device, e.g. Yelp!®, can send a uniform resource locator (URL) as clear text to a server. The server can learn the frequency with which users select the link by reading the clear text of the link received in the crowdsourced data. The servers can read the clear text of deep links, emojis, and words obtained received from user client devices. However the server does not update the users' dictionaries, asset catalog, or applications to provide the client device with the most frequently selected emojis, deep links and words at the top of a list of such terms.

In addition, current servers' use of the clear text in user messages compromises the privacy of users. Some applications on mobile devices currently share location data with servers to help the user obtain results that are relevant to the user's location. Some applications, such as web browsers, track a user's location using an internet protocol (IP) address, cell tower location, WiFi router address and network name (which may literally identify the business or user that owns the router), or other location tracking means. Servers store clear text of a user's queries to the server. Servers can also store feedback data indicating which links a user selected, and any queries that followed a selection. Servers can also track the dwell time that a user looks at content presented to the user. Further, server owners sell and share information with one another. For example, a social network may sell user information and preferences to content providers so that the content providers can push content deemed relevant to the user, based upon the user information, location information, and clear text from the user that is collected by the server. In combination, these information sources can identify a particular computer, or user, with reasonable specificity, compromising the privacy of the user.

SUMMARY OF THE DESCRIPTION

Systems and methods are disclosed for generating and updating term frequencies of known terms using crowd-sourced differentially private sketches of the known terms. A sketch is a representation of client data to be shared with a server, the representation produced by applying an algorithm, such as a hash or differential privacy algorithm which may utilize a hash, to the client data to be shared with the server. Terms can include emojis, deep links, words, etc. A sketch of a term is a computed representation of the term. In a crowdsourced, client/server environment, a local differential privacy system introduces randomness to client data prior to a client sharing the data with a server. A server can learn from the aggregation of the crowdsourced data of all clients, but cannot learn the data provided by any particular client. Instead of having a centralized data source $D=\{d1, \ldots, dn\}$, each data entry $d_i$ belongs to a separate client i. Given the transcript $T_i$ of the interaction with client i, it is not possible for an adversary to distinguish $T_i$ from the transcript that would have been generated if the data element were to be replaced by null. The degree of indistinguishability is parameterized by $\varepsilon$, typically considered to be a small constant. A formal mathematical definition of local differential privacy is described below:

Let n be the number of clients, let $\Gamma$ be the set of all possible transcripts generated from any single client-server interaction, and let $T_i$ be the transcript generated by a differential privacy algorithm A while interacting with the client i. Let $d_i \in S$ be a data element for client i. Algorithm A is $\varepsilon$-locally differentially private if, for all subsets $T \subseteq \Gamma$, the following holds:

$$\forall\, i \in [n],\, d \in S,\, \left| \ln \frac{Pr[Ti \in \Gamma \mid d_i = d]}{Pr[Ti \in \Gamma \mid d_i = \text{null}]} \right| \leq \varepsilon;$$

and $d_i$=null refers to the case where the data element for client i is removed.

The systems and methods disclosed herein provide learning of trending emojis and deep links while preserving user privacy. The systems and methods disclosed herein include an $\varepsilon$-local differentially private count-median-sketch (CMS) and a Hadamard $\varepsilon$-local differentially private count-median-sketch (CMS) that compare favorably to prior art methods with respect to error, communication load, space used, and client and server computation, as shown in the table below.

| | Error | Communication | Space | Client Computation | Server Computation |
|---|---|---|---|---|---|
| Applicant's CMS | $\Theta\left(\dfrac{1}{\sqrt{n}}\right)$ | $O(\sqrt{n})$ | $O(\sqrt{n})$ | $O(\sqrt{n})$ | $O(\sqrt{n})$ |
| Applicant's Hadamard CMS | $\Theta\left(\dfrac{1}{\sqrt{n}}\right)$ | $O(1)$ | $O(\sqrt{n})$ | $O(\log n)$ | $O(\sqrt{n})$ |
| Prior art (Bassily & Smith) | $\Theta\left(\dfrac{1}{\sqrt{n}}\right)$ | $O(1)$ | $O(n)$ | $O(\log n)$ | $O(n)$ |
| Prior art (Hsu, Khanna, Roth) | $O\left(\dfrac{1}{n^{\frac{1}{6}}}\right)$ | $O(n)$ | $O(n)$ | $O(\log n)$ | $O(n)$ |

Each client device monitors its own local differential privacy using a privacy budget on the client device. Terms can be classified, and each classification can have its own privacy budget. A privacy budget can be periodically replenished or increased. A classification is a conglomeration of similar types of information. A classification can include emojis, deep links, locations, finance terms, health terms, and the like.

Known terms can be stored in an asset catalog that can be stored on each client device and on a term frequency server. The asset catalog can store the known terms and frequency of use of the terms across crowdsourced data so that an application using the classification of terms can rank the most frequently used terms toward the top of a list of suggested terms. In an embodiment, each classification can be associated with one or more sessions, wherein each session can be associated with an application or product type. For example, the emoji classification can be associated with a messaging application or keyboard. Similarly, the deep links classification can be associated with an application that guides a user to certain types of content access by a uniform resource locator (URL), within the application or a browser session. A deep link (or universal link) may include, for example, a link from a search result, that when selected, launches an application installed on a device. Words generated by a finance application or finance tab can be classified in the finance classification.

A term frequency server can update frequencies of known terms, thereby generating an updated asset catalog. The updated asset catalog can be published by the term frequency server to one or more client devices.

To further maintain privacy, the term frequency server can periodically purge all or a portion of differentially private sketches received as crowdsourced data.

In an embodiment a non-transitory computer readable medium can store executable instructions, that when executed by a processing system, can perform any of the functionality described above.

In yet another embodiment, a processing system coupled to a memory programmed with executable instructions can, when the instructions are executed by the processing system, perform any of the functionality described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

The present disclosure recognizes that the use of personal information data collected from a large population of users, in the present technology, can be used to the benefit of all or many users while still maintaining the privacy of individual users. For example, the term frequencies that are learned from crowdsourced data can be identified and included in on-device dictionaries to provide an ordered list of trending terms, e.g., as suggestions. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
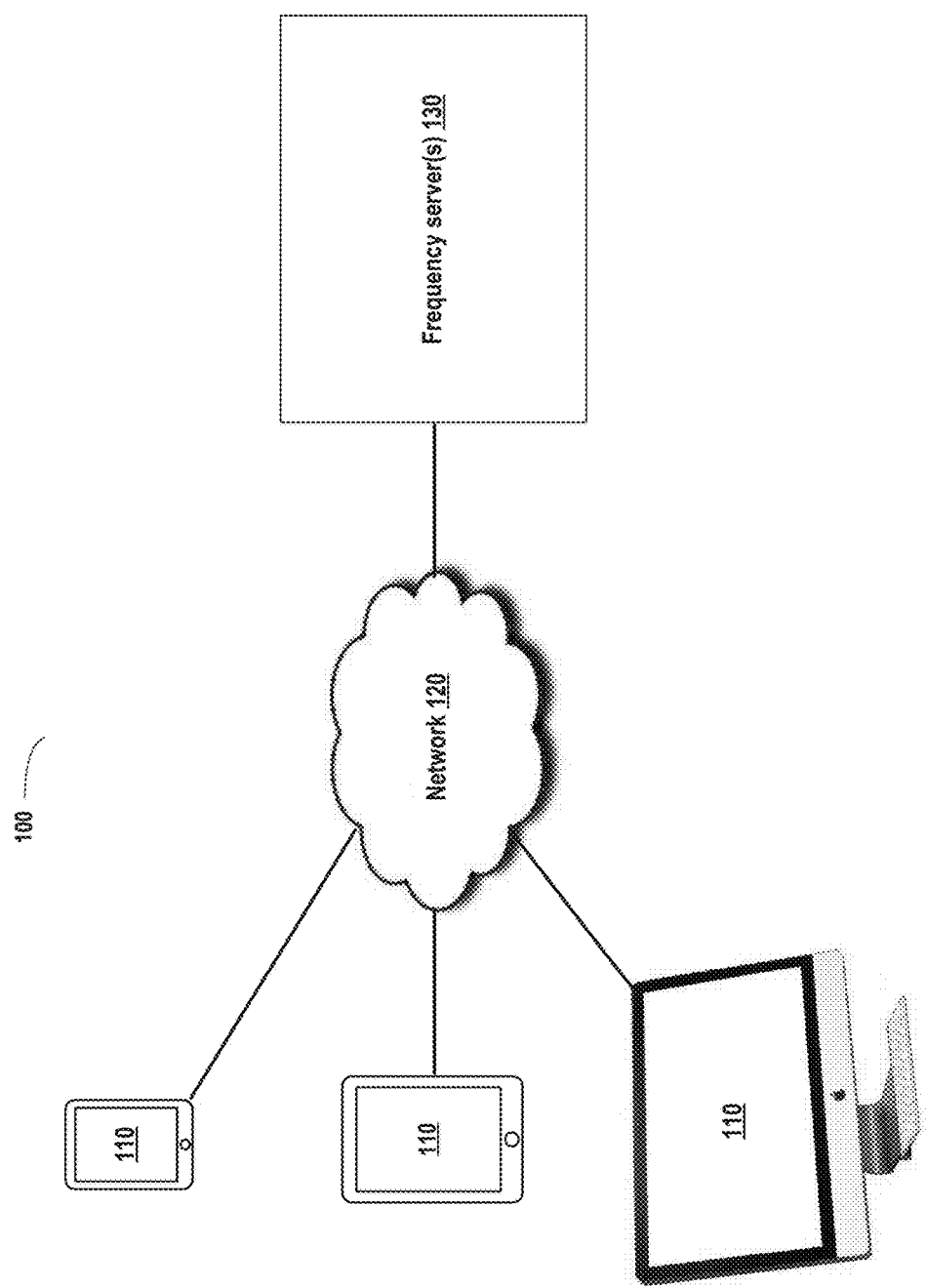
FIG. 1 illustrates, in block form, an overview of a system for learning frequency of emojis, deep links, and other known terms used by clients while preserving client privacy, according to some embodiments.

FIG. 1 illustrates, in block form, an overview of a system 100 for learning frequency of emojis and deep links used by clients while preserving client privacy, according to some embodiments.

Client devices 110, each associated with a user in a large plurality of users (crowdsource), can be coupled to one or more term frequency server(s) 130 ("term frequency server 130") via network 120. Each client device 110 can send a local differentially private sketch of one or more terms, in one or more classifications, to a term frequency server 130. A local differentially private sketch is a sketch that is generated on a client device 110 using a differential privacy algorithm. Collectively, the local differentially private sketches received by term frequency server 130 from the large plurality of client devices 110 comprise crowdsourced data. Term frequency server 130 can use the crowdsourced data to learn the frequency of usage of emojis, deep links, search terms, items purchased using on-device payment technologies (e.g., Apple® Pay), media content that is consumed by the user, frequency of certain types of exercise, e.g. miles walked, push-ups performed/time, treadmill steps, and financial data such as rate of return on a investment, frequency of sale/trade of a certain stock, (collectively, "terms") among the large plurality of client devices 110, while maintaining privacy of each of the client devices 110. Client-side differential privacy implemented for crowdsourced data ensures that the term frequency server 130 learns the frequency of usage of terms of all client devices 110 without learning the usage of a term by any particular client device within a privacy guarantee constant, c, described above. A privacy guarantee ensures that there is sufficient randomization (or "noise") within data transmitted by any particular client that a server cannot learn the data that the particular client is transmitting. Noise and privacy are reduced with each piece of information that the client device 110 shares with the server. Systems and methods described herein use a privacy budget, E, to limit the amount of data shared with a server, to maintain the privacy guarantee. A server can periodically purge portions of crowdsourced data, including the data of any particular client, thereby replenishing the privacy budget of the client device. Client device 110 can comprise any type of computing device such as a desktop computer, a tablet computer, a smartphone, television set top box, or other computing device 110 such as iPhone®, Apple® Watch, Apple® TV, etc., as described below with reference to FIG. 7.

Network 120 can be any type of network, such as Ethernet, Token Ring, Firewire, USB, Fibre Channel, or other network type.

Term frequency server 130 can comprise one or more hardware processors, memory, storage devices such as one or more hard disks, solid state storage devices, CD-ROM storage, DVD-ROM storage, storage appliances, etc. Exemplary components of term frequency server 130 are described below with reference to FIG. 7.

Figure 2:
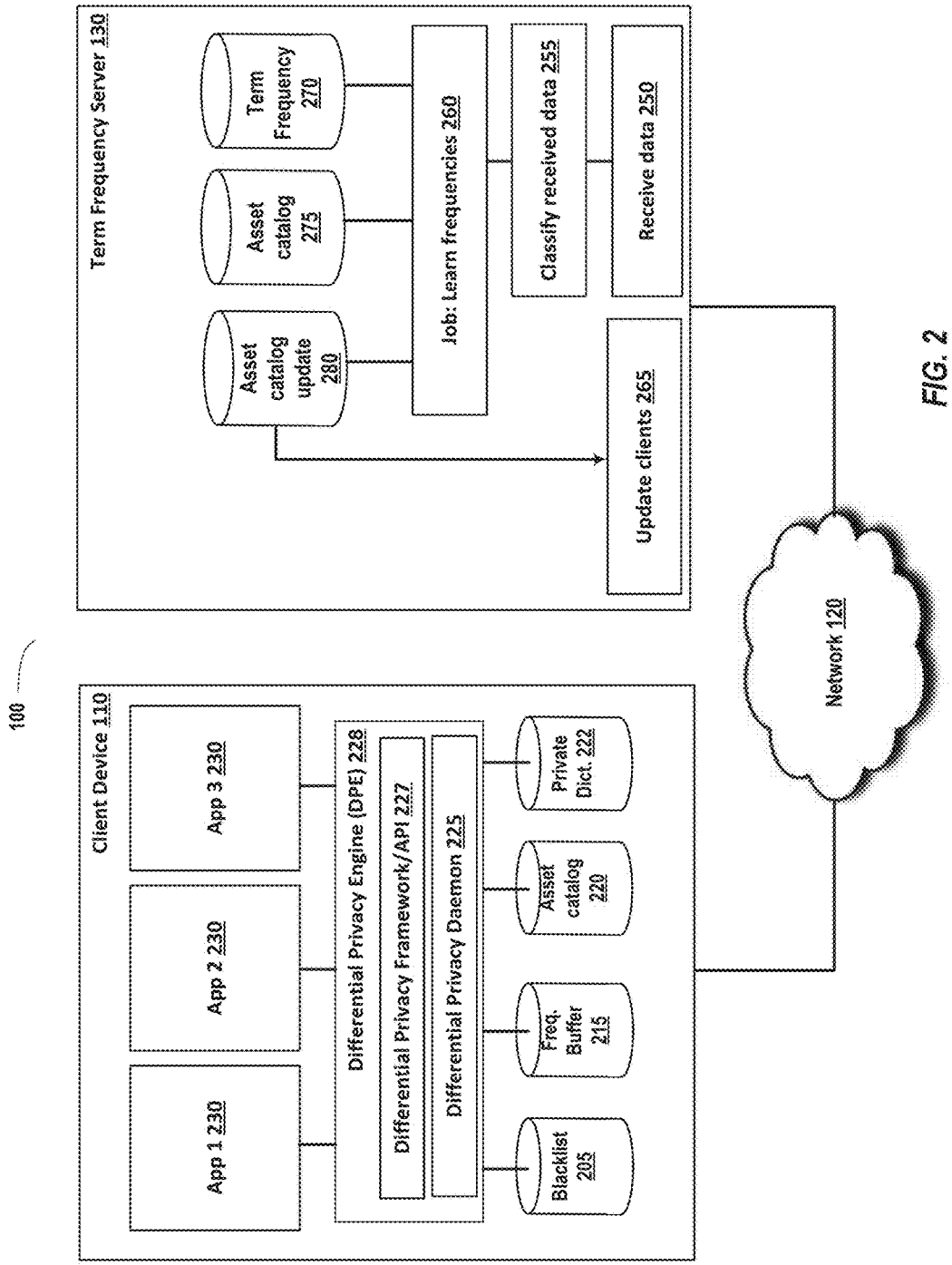
FIG. 2 illustrates, in block form, a detailed view of a system for learning frequency of emojis and deep links used by clients while preserving client privacy, according to some embodiments.

FIG. 2 illustrates, in block form, a detailed view of a system 100 for learning frequency of emojis and deep links used by clients while preserving client device 110 privacy, according to some embodiments.

Internal components of client device 110 can include a plurality of storages 205-222, a differential privacy engine (DPE) 228 that can comprise a differential privacy daemon 225 and a differential privacy framework or application programming interface (API) 227, and a plurality of applications 230, e.g. App 1, App2, and App 3. APIs are described in detail, below, with reference to FIG. 6.

Storages 205-222 can include a blacklist 205, a frequency buffer 215, an asset catalog 220, and a private dictionary 222. Blacklist 205 can be used to determine terms that are not to be sent to term frequency server 130. A term may be blacklisted for a variety of reasons, including blacklisting of URLs that are so frequent for any user, or a particular user, that the frequency of usage of the URL is not to be transmitted to the term frequency server 130. An example may include the URL of the default search engine configured in a browser on the client device 110, or a URL to one or more email servers configured on the client device 110. In an embodiment, client only sends a term once to the term frequency server 130. A user may also prefer to blacklist certain terms as having a high level of privacy to the user such that the user does not want to transmit the URL, or other term, to the term frequency server 130 no matter how great the guarantee of privacy from the term frequency server 130. Blacklist storage 205 can be used to store terms that have been previously transmitted by client device 110 to term frequency server 130. In an embodiment, differential privacy engine 228 can check the blacklist storage 205 before processing a term to ensure that a term is sent only once to the term frequency server 130. To preserve a privacy budget of the client device 110, a term that is in blacklist storage 205 may not be re-sent to the term frequency server 130.

Privacy budget is a quantity, E, that ensures the privacy of an individual is not compromised after repeated donation of information to the term frequency server 130. A privacy budget E quantifies the amount of information leaked by a client device 110 to a server by the sending of differentially private information to the server. Every submission to a server of differentially private information, e.g. the use of an emoji, consumes a portion ε of the privacy budget E for the client device 110. If a client device 110 submits k pieces of information through a privacy channel to a server, then $\varepsilon \leq E/k$ to ensure that the overall privacy budget E is not violated. A separate privacy budget, E, is allocated to each classification of information. Each time a term is transmitted to term frequency server 130, a privacy budget for a classification of the term is charged or reduced by some amount. For example, in a classification of emoji, if a client device transmits two emojis to the term learning server 130, the client device emoji classification budget would be charged a portion of the privacy budget E for the emoji classification for each transmitted emoji.

When data for a classification is purged from term frequency server 130, it is possible to replenish the privacy budget for the classification on a client device 110. Periodically, the privacy budget for the classification is replenished on the client device. In an embodiment, replenishment of the client device 110 privacy budget for a classification is synchronized with purging of client device data for one or more client devices on term frequency server 130. In an embodiment, replenishment of a client device privacy budget for a classification of terms is asynchronous with term frequency server 130 purging client device data for a plurality of client devices 110.

A term frequency buffer 215 can comprise a storage that holds candidate terms for transmission to term frequency server 130. If a client sends too many candidate terms to the term frequency server, privacy can be reduced. The term frequency buffer 215 can hold a plurality of candidate terms. The client may not send all candidate terms in the term frequency buffer 215 during an interval of time. The interval of time can allow for the client device privacy budget to be replenished before transmitting more candidate terms to the term frequency server 130. Term frequency buffer 215 can be sampled and selected terms can be transmitted to the term frequency server 130.

Asset catalog 220 can store terms and frequencies for terms known to term frequency server 130. In an embodiment, differential privacy engine 228 can use the asset catalog 220 to decide whether a term is already known to the term frequency server 130. In an embodiment, differential privacy engine 228 of a client device 110 sends a term to term frequency server 130 only once.

Client device 110 can further include a private dictionary 222 that stores terms that a user of a client device 110 may want to consider familiar or frequent, i.e., known to the particular client device. In an embodiment, the user can designate a term in private dictionary 222 as eligible, or ineligible, for sending to the term frequency server 130. Differential privacy engine 228 can receive a term from an application and access the private dictionary 222 to determine whether the term is eligible to be sent to term frequency server 130.

Server 130 can comprise a module to receive data 250, a module to classify received data 255 according to a classification system, and a job to learn frequencies 260 from received, de-identified sketch data. Term frequency server 130 can further include one or more storages, including a term frequency storage 270, an asset catalog 275, and an updated asset catalog 280. A module to update clients 265 can publish the asset catalog update 280 to one or more client devices 110.

Receive module 250 can asynchronously receive sketches of known terms for a large plurality of client devices 110 ("crowdsourced data"). Receive module 250 can remove from the received sketch data any latent identifiers, such as IP address, meta data, session identifier, or other data that might identify a particular client device 110 that sent the sketch data.

Classify received data module 255 can extract classification data from the received sketches and group received sketch data by classification. Classifications can include emojis, deep links, locations, finance terms, health terms, and the like.

Learn frequencies job 260 can periodically process the received, de-identified, and classified sketch data received from the large plurality of client devices 110. Learn frequencies job 260 can include operations that include determining a sketch for each known term in a classification. In an embodiment, term frequency database 270 can store previously calculated sketches for known terms so that learn frequencies job 260 need not recompute the sketches. In an embodiment, learn frequencies job 260 can store a subset of all sketches computed from known terms. In an embodiment, learn frequencies job 260 can store sketches with high frequencies. A sketch with a high frequency relative to other sketches likely indicates that future received sketches from client devices may include sketches of these high frequency known words. Learn frequencies job 260 can also update asset catalog 275 to generate asset catalog update 280 with updated frequencies of known terms.

Figure 3A:
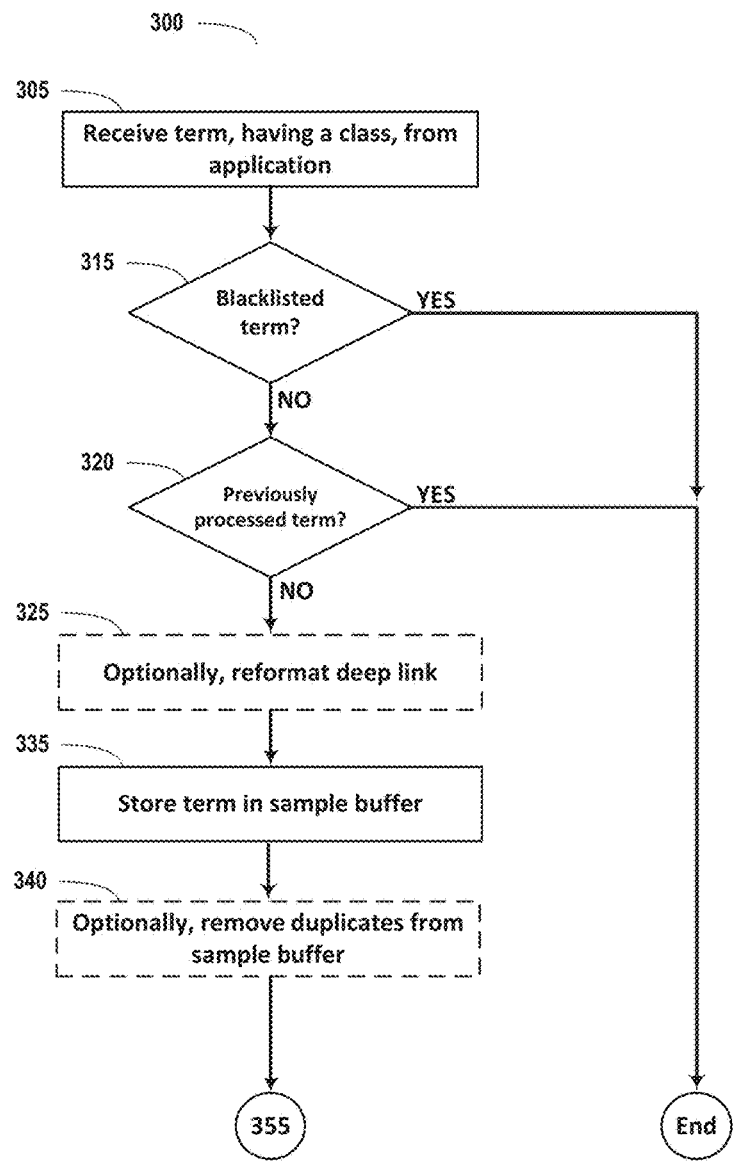
FIGS. 3A and 3B illustrate, in block form, a method of a client-side process that generates frequency information about an emoji, deep link, or term used by a client device while preserving client privacy, according to some embodiments.
Figure 3B:
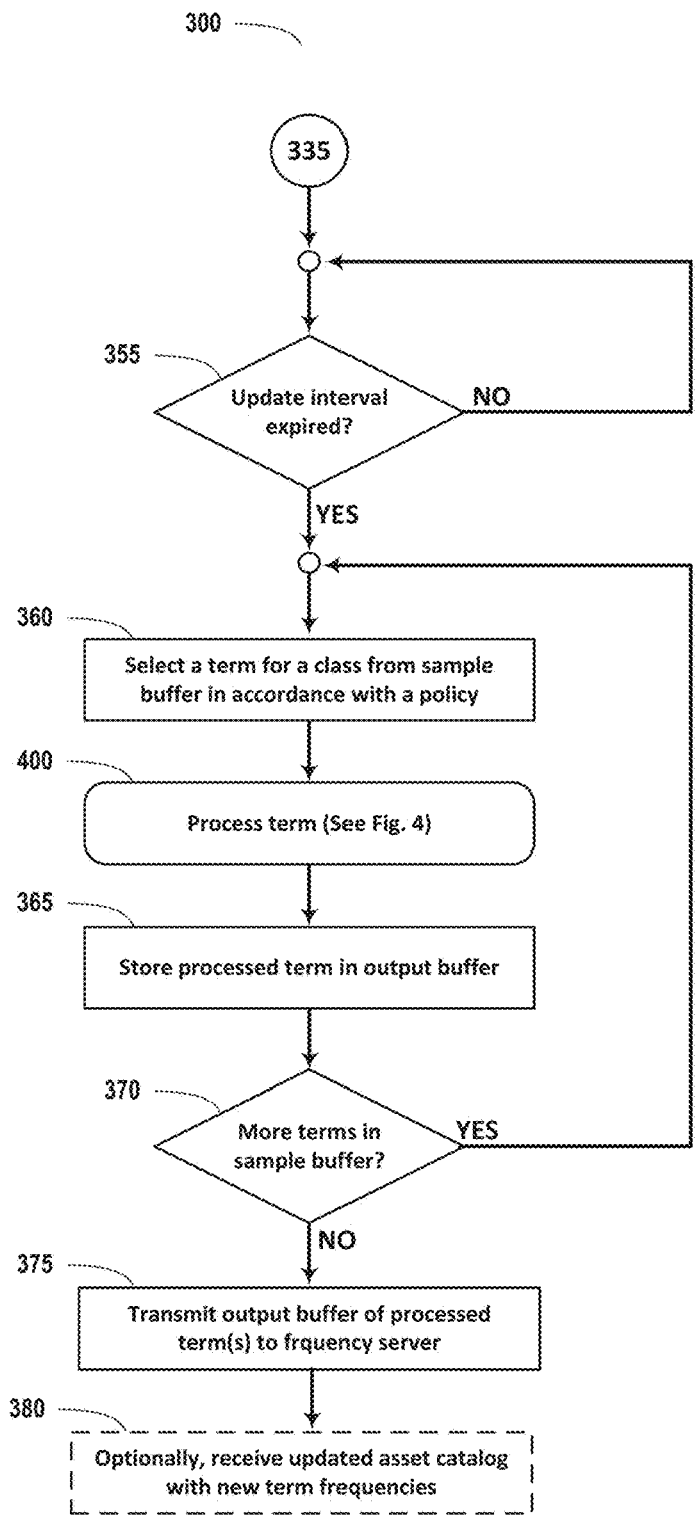

FIGS. 3A and 3B illustrate, in block form, a method 300 of a client-side process that generates frequency information about an emoji, deep link, word, or other term used by a client device 110 while preserving client privacy, according to some embodiments.

In operation 305, differential privacy engine (DPE) 228 can receive a term from an application 230. A term can be an emoji, a deep link, a location, a finance term or health term, or other term. An application 230 can be an email application, a messaging application, a word processing application, a web browser, a client device browser, an online store application, an online media service application, or any other application. An application 230 can determine a classification (class) for the term. A class can be a language, e.g. English or Chinese. In an embodiment, a class can be shared by a plurality of applications 230. In an embodiment, a class can be health, finance, legal terms, or other use case classification. As an example, DPE 228 can receive the term a happy face emoji from a messaging application 230 and determine that the term is associated with the keyboard usage classification. As another example, the DPE 228 can receive a deep link of an Italian restaurant and determine that the deep link is associated with a restaurants classification. Each classification of terms can have its own privacy budget.

In operation 315, application 230 or DPE 228 can determine whether the term is stored in blacklist storage 205. If the term is stored in blacklist storage 205 then method 300 ends. Otherwise, method 300 resumes at operation 320.

In operation 320, it can optionally be determined whether the term has been previously processed by DPE 228. A previously processed term can include a term that has been previously transmitted to term frequency server 130 by this client device 110. A previously processed term can include a term that is in a private dictionary 222 and the user has previously determined that the term should not be sent to the term frequency server 130. If the term has been previously processed, then the method 300 ends. Otherwise, method 300 resumes at operation 325.

In operation 325, a term that comprises a deep link can optionally be reformatted into a common format with other deep links. In an embodiment, a whitelist of deep links that conform to a common format can be used to compare to the received deep link. If the received term is not found in the whitelist of deep links, it can be a candidate for reformatting. Some applications may include parameters in the deep link, e.g. a user session identifier. These can be reformatted to exclude the session identifier. Some applications generate deep links in a format that can be discerned and rewritten into a common format, such as a hierarchical format. For example, app5 may receive a search query for French Food that can be reformatted in hierarchical form. For example, the following example deep links may be received by DEP 228, and reformatted as shown. Reformatting of the app4 links generates duplicates that can be optionally removed in operation 340, below.

| Deep Link, as received | Deep Link, as reformatted |
|---|---|
| app://app1/home | app://app1/home |
| app://app2/home | app://app2/home |
| app://app3/restaurant/1 | app://app3/restaurant/1 |
| app://app3/restaurant/2 | app://app3/restaurant/2 |
| app://app3/restaurant/3 | app://app3/restaurant/3 |
| app://app4/user?oan3o1nia | app://app4/user |
| app://app4/user?pa01lanap | app://app4/user |
| app://app4/user?mbna1man9 | app://app4/user |
| app://app5/search?FrenchFood | app://app5/search/restaurants/French |

In operation 335, the term can be stored in a sample buffer or queue in learning buffer 215. Each time a term is sent, a portion of the privacy budget for a classification is charged, and the privacy of the data is reduced.

In operation 340, duplicate terms, such as reformatted duplicate deep links shown in operation 325, above (app://app4/user occurs 3 times), can be removed. After operation 340, method 300 resumes at operation 355 as described below with reference to FIG. 3B.

Terms can be held in frequency buffer 215 such that a batch of terms are gathered together for sending to term frequency server 130 within a time interval.

In FIG. 3B, in operation 355, it can be determined whether an update interval has expired. If not, then the update interval can be periodically rechecked in operation 355 until the interval has expired.

To preserve privacy budget for each classification of terms, terms are held in a learning buffer 215, then, after an interval of time, a term is selected from a classification in the learning buffer 215 for processing. In an embodiment, the terms in the buffer are processed in a queue order. In an embodiment, a term is selected at random from the buffer in accordance with a policy. This process slows the rate at which terms are sent to the term learning server 130 and extends the life of the privacy budget. In an embodiment, DPE 228 can contain logic that determines when a privacy budget for a classification is depleted. DPE 228 can then monitor the elapsed time before the privacy budget is replenished. The time interval between client intervals of processing can be extended or contracted, based upon the amount of privacy budget available at any time. Before selecting a term, it can be determined whether there is privacy budget available to send the term to the term frequency server 130. A term may not be processed if there is no privacy budget available for the classification of the term.

If in operation 355, the update interval has expired. If not, then the update interval can be periodically rechecked in operation 355 until the interval has expired. The update interval can be used to meter the donation of information by the client device 110, to preserve privacy budget on the client device. If in operation 355, the update interval has expired, then method 300 resumes at operation 360.

In operation 360, a term can be selected from the sample buffer in frequency buffer 215. In an embodiment, the sample buffer can hold a plurality of terms, optionally organized by classification, such that a term can be selected at random from the sample buffer for processing in preparation for transmission to term frequency server 130. In an embodiment, terms can be selected from the sample buffer in a queue order. In an embodiment, terms can be selected from the sample buffer in a random order. In an embodiment, selection of terms from the sample buffer can be performed in accordance with a policy. A policy can be determine per application, or per classification of terms.

In operation 400, the selected term is processed for sending to term frequency server 130. Operation 400 is described in detail below with reference to FIG. 4.

In operation 365, the processed term can be stored in a buffer in frequency buffer 215 for transmission to term frequency server 130.

In operation 370, it can be determined whether there are more terms in the sample buffer to consider for processing and transmission to term frequency server 130. If so, then method 300 resumes at operation 360, otherwise method 300 resumes at operation 375.

In operation 375, one or more terms in an output buffer of processed terms can be transmitted to term frequency server 130.

In an embodiment, the terms that were processed and transmitted to term frequency server in operation 375 can be memorized in blacklist storage 205. In an embodiment, application 230 that initially selected the word for processing in operation 305 of FIG. 3A can determine whether the word should be added to blacklist storage 205.

In operation 380, client device can optionally receive an updated asset catalog from term frequency server. The updated asset catalog 220 can have one or more updated frequencies of terms, updated by the term frequency server 130 in response to crowdsourced data received by term learning server 130.

Figure 4:
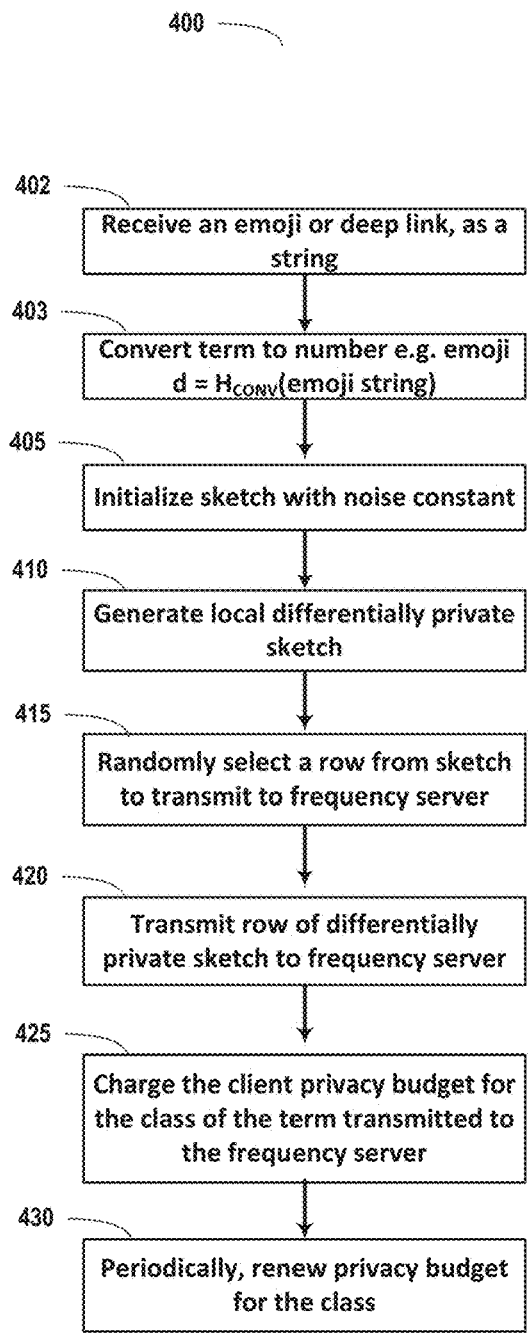
FIG. 4 illustrates a method of a client device generating a differentially private sketch of a representation of an emoji, deep link, or other term for transmittal to a term frequency server 130, according to some embodiments.

FIG. 4 illustrates a method 400 of a client device 110 generating a differentially private sketch of a representation of an emoji, deep link, or other term for transmittal to a term frequency server 130, according to some embodiments.

A sketch provides a succinct data structure to maintain a frequency of a domain of elements $S=\{s_1, \ldots, s_p\}$ present in a data stream $D=\{d_1, \ldots\}$. Let $H=\{h_1, \ldots, h_k\}$ be a set of k pair-wise independent hash functions such that each h∈H is h: S→[m]. Client and server differential privacy algorithms can agree on a common set of k pair-wise independent hash functions $H=\{h_1, \ldots, h_k\}$ which map to [0 ... m). In an embodiment, m can be $\sqrt{n}$, wherein n is a number of client samples of data to be collected by the server. The value m can be a nearest power of 2 to the value of $\sqrt{n}$. In an embodiment, k can be approximately 8·ln(p), wherein p is approximately equal to |S|; the count of data items in S for the classification of terms.

The differential privacy sketch can be one of two types: (1) an ε-local differentially private sketch, $A_{CLIENT}$, or (2) a Hadamard ε-local differentially private sketch, $A_{CLIENT-Hadamard}$.

An ε-local differentially private version of the count-median-sketch (or count-minimum-sketch) can be used on a server to generate a frequency oracle that maintains user privacy. A frequency oracle is a function that returns an estimated count of a data item s∈S based on data received $D=\{d_1, \ldots\}$ from n clients. A client local differentially private sketch and a server frequency oracle can be implemented using the following client algorithm, $A_{CLIENT}$, and server algorithm, $A_{SERVER}$, or the Hadamard versions of the algorithms, $A_{CLIENT-Hadamard}$ and $A_{SERVER-Hadamard}$. The server algorithms, $A_{SERVER}$ and $A_{SERVER-Hadamard}$, can each have two different forms: a count-minimum sketch and a count-median-sketch. The client and server differential privacy algorithms can agree on a common set of k pair-wise independent hash functions $H=\{h_1, \ldots, h_k\}$ which map to [0 ... m). $A_{CLIENT}$ can initialize a vector $v \leftarrow [-1]^m \cdot c_\varepsilon$, wherein $c_\varepsilon$ adds noise with mean value 0 to the vector v. To ensure local differential privacy, the client algorithm chooses a hash function uniformly at random, unbiased, from H and flips the sign of v[h(d)] with probability $1/(1+e^\varepsilon)$. Unbiasedness is ensured by representing the bits of vector v using $\{-1,+1\}$ rather than $\{0,1\}$.

In operation 402, DPE 228 can receive term (emoji or deep link) represented as a string.

In operation 403, DPE 228 can convert the term to a numeric value by taking a hash of the string, $H_{CONV}$, e.g. SHA256(term). The term (emoji or deep-link) is encoded as a number, d, in the range of 0 .... p, using a hash function, $H_{CONV}$, such as SHA256, wherein p is the estimated vocabulary size for the classification. In an embodiment, $d=H_{CONV}$(term) modulo p, such that d∈[0,p). In an embodiment, p=is approximately 5,000 for emojis and p is approximately 1 billion for deep links. Other values of p can be selected for different classifications of terms.

Input for the client-side ε-local differentially private algorithm, $A_{CLIENT}$, can include: (1) privacy parameter, ε; (2) hashing range, m; (3) k pair-wise independent hashing functions $H=\{h_1, \ldots, h_k\}$ with each $h_i$: S→[m]; and (4) data element: d∈S.

Operations 405 and 410, below of algorithm $A_{CLIENT}$, generate the ε-local differentially private sketch.

In operation 405 a constant $$c_\varepsilon \leftarrow \frac{e^\varepsilon + 1}{e^\varepsilon - 1},$$

can be calculated and a vector v can be initialized: $v \leftarrow -c_\varepsilon^m$. Constant $c_\varepsilon$ keeps the noise added to maintain privacy at mean zero, unbiased.

In operation 410, the sketch for $A_{CLIENT}$ can be generated with the following operations:
1. Sample uniformly at random a hash function h independent and identically distributed (i.i.d.) from a set of hash functions $H=\{h1, \ldots, hk\}$ and set $v[h(d)] \leftarrow -c_\varepsilon$.
2. Sample a vector $b \in \{-1,+1\}^m$, with each $b_j$ is independent and identically distributed having +1 with probability $$\frac{e^\varepsilon}{e^\varepsilon + 1}$$

3.

$$v_{priv} = \left\{\left(\frac{v[j] * b[j] + 1}{2}\right), \forall j \in [m]\right\}$$

4. Return vector $v_{priv}$ and the chosen hash function h.

If the client, instead, generates the Hadamard version of the ε-local differentially private sketch, $A_{CLIENT-Hadamard}$, the inputs to $A_{CLIENT-Hadamard}$ can be: (1) privacy parameter, ε; (2) hashing range, m; (3) k pair-wise independent hashing functions $H=\{h_1, \ldots, h_k\}$ with each $h_i$: S→[m]; and (4) data element: d∈S.

Operations 405 and 410, below, generate the Hadamard version of the ε-local differentially private sketch, $A_{CLIENT-Hadamard}$.

In operation 405, a constant $$c_\varepsilon \leftarrow \frac{e^\varepsilon + 1}{e^\varepsilon - 1}$$

can be calculated and a vector v can be initialized: $v \leftarrow [0]^m$.

In operation 410, the sketch for $A_{CLIENT-Hadamard}$ can be generated with the following operations:
1. Sample uniformly at random a hash function h independent and identically distributed from a set of hash functions $H=\{h_1, \ldots, h_k\}$ and set $v[h(d)] \leftarrow 1$.
2. Generate a vector $$v_{Hadamard} \leftarrow \frac{1}{\sqrt{m}} \cdot H_m \cdot v$$

where $H_m$ is a Hadamard matrix of dimension m.
3. Sample an index j, independent and identically distributed in [m] and a bit $b \in \{-1,1\}$ such that b is "1" with probability $$\frac{e^\varepsilon}{e^\varepsilon + 1}.$$

4. Return $c_\varepsilon \cdot b \cdot v_{Hadamard}[j]$, the selected hash function h, and the selected index j.

In operation 415, a row of the ε-local differentially private sketch can be randomly selected for transmission to the term frequency server 130.

In operation 420, DPE 228 can transmit the randomly selected row of the differentially private sketch, and the row number of the randomly selected row, to the term frequency server 130.

In operation 425, DPE 228 can charge the differential privacy budget for the classification in response to transmitting the differentially private sketch of the term to the term frequency server 130.

In operation 430, the privacy budget for the classification can be periodically renewed or replenished. In an embodiment, the privacy budget for a classification is renewed or replenished asynchronously from term frequency server 130 purging a portion of client data for a plurality of clients.

Figure 5A:
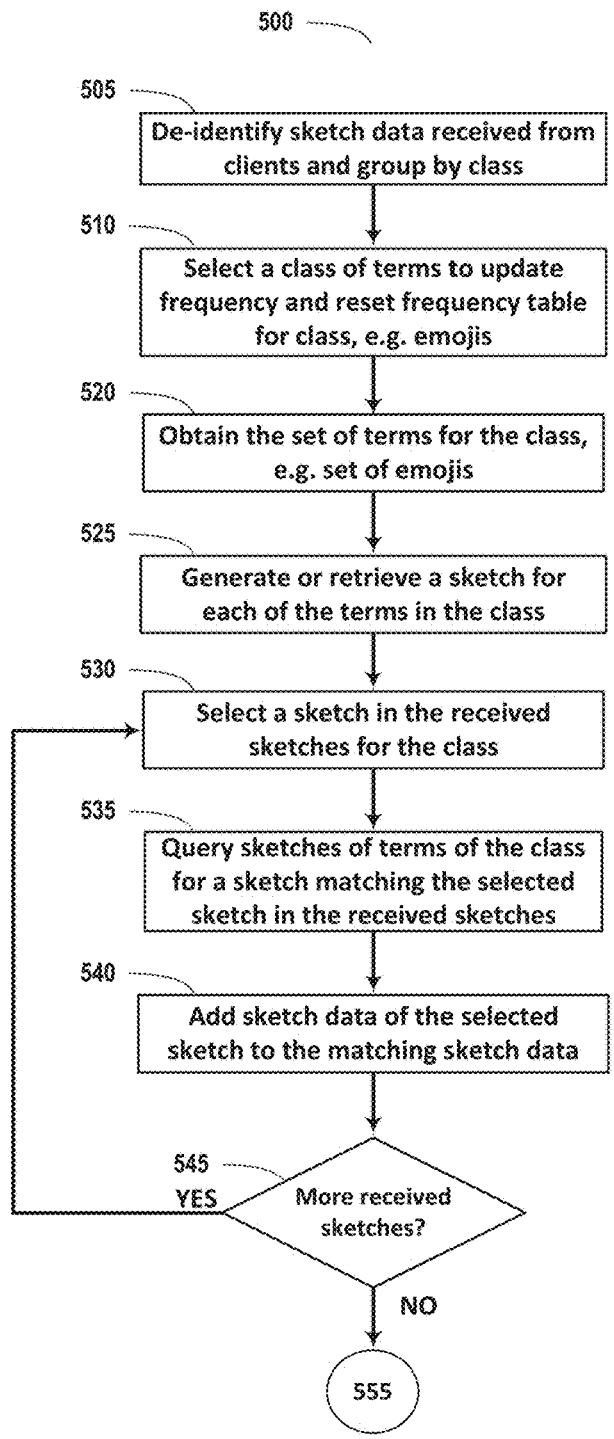
FIGS. 5A and 5B illustrate, in block form, a method of a server learning the frequency of usage of known keywords using crowdsourced data while maintaining client device privacy, according to some embodiments.
Figure 5B:
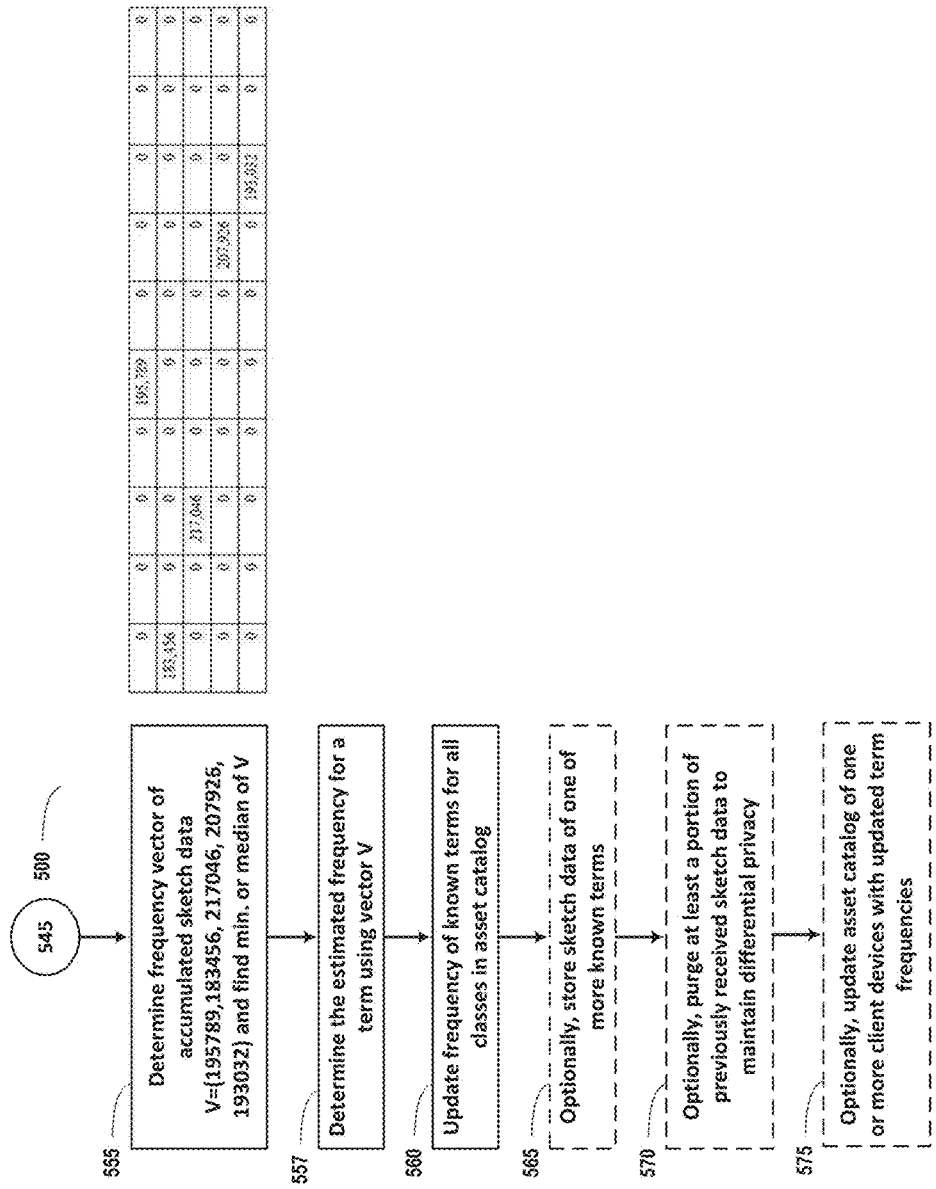

FIGS. 5A and 5B illustrate, in block form, a method 500 of a term frequency server 130 aggregating crowdsourced usage of an emoji, deep link or other term while preserving client privacy, according to some embodiments. In an embodiment, term frequency server 130 can add newly received crowdsourced term frequency information to existing term frequency information stored in term frequency database 270. In an embodiment, term frequency server 130 can purge a portion of previously received term sketch data, retaining a portion of previously received term sketch information. In an embodiment, term frequency server 130 can purge all previously received term sketch data for a classification of term before processing newly received term sketch information.

In FIG. 5A, operation 505, term frequency server 130 de-identifies term sketch data received from client devices 110 and groups term sketch data by term classification. De-identification can include removing an internet protocol (IP) address from the received data, removing any metadata or other data that identifies, or can be used to identify, a particular client with reasonable specificity.

In operation 510, term frequency server 130 can select a classification of term sketches to process from the sketch data received by term frequency server 130 from a plurality of client devices 110. For example, term frequency server 130 can select received data 250 from client devices 110 corresponding to the classification, "emojis." Term frequency server 130 can reset a sketch frequency table for sketch data for the selected class of terms, e.g. emojis, to all zeroes.

In operation 520, term frequency server 130 can obtain the set of known terms for the class, e.g. the set of emojis known to the term frequency server 130. In an embodiment, the set of known terms for the class can be retrieved from asset catalog 275.

In operation 525, learn frequencies job 260 can generate, or retrieve, a sketch for each known term in the classification, e.g. emojis. A sketch for, e.g., an emoji can be used as an index to match received sketch data with a sketch of a known emoji. One or more sketches of known terms in a classification can be retrieved from term frequency database 270. In an embodiment, a sketch of each known term, e.g. emoji, is stored in a storage such as term frequency storage 270. By storing the sketch of each emoji, the sketch need not be regenerated for a next learn frequencies job 260. In an embodiment, one more sketches of the terms for the class can be generated during a learn frequencies job 260. In an embodiment, terms with high frequencies, e.g. above a predetermined threshold frequency such as +2 standard deviations from the median term frequency for the classification, can be stored, while the remaining sketches are regenerated during each learn frequencies job 260. In an embodiment, a machine learning algorithm, such as linear regression, Bayes, naive Bayes, et al., can be used to determine an optimal balance between storage used, processing power used, and run-time duration of learn frequencies job 260.

In operation 530, sketch data can be retrieved from the received sketch data. The sketch data received from the client data can be used to lookup a matching sketch in the sketches of the known terms on the term frequency server 130. The matching sketch being retrieved is in the class selected in operation 510.

In operation 535, learn frequencies job 260 can query the sketches of the known terms to find a match with the selected row of the sketch selected from the data received from the clients 250. Retrieving the matching sketch to the selected client data sketch can further include retrieving frequency information for the matching sketch and comparing the selected row of the sketch received from the selected client to the matching sketch. Frequency information can include a cumulative frequency of use of the term, e.g. emoji, corresponding to the sketch, since the time that the term was first introduced on the term frequency server 130. Frequency information can comprise the frequency that the term was used during the processing of one more learn frequencies jobs 260. Frequency information can further include the sample size of the client data received for the all sketches during each of the one or more learn frequencies jobs 260 to indicate a trending direction, up or down, in frequency for the term, over time.

In operation 540, sketch frequency information data from the selected sketch data can be added to sketch data of the queried matching sketch of a known term. The matching queried sketch of the know term, e.g. emoji, can be increased by an amount indicated by the selected sketch data. In an embodiment, a client can aggregate its own number of uses of a term before sending the term and its frequency information to the term frequency server. By doing so, the client accounts for multiple uses of a single term, e.g. particular emoji, to account for the usage of the term by the client, while maximizing privacy by sending the usage of any particular emoji only one time, even though the client has used the emoji one or more times during a particular learn term frequency job 260 interval.

The specific operations for updating the sketch frequency information from the selected sketch data to the matching sketch can depend upon whether the client used the ε-local differentially private sketch algorithm, $A_{CLIENT}$, or the Hadamard ε-local differentially private sketch algorithm $A_{CLIENT\text{-}Hadamard}$. The operations for each are described below.

In the case that the client used the $A_{CLIENT}$ algorithm to generate the selected sketch data, then in operation 540 the selected sketch data, vector $v_{priv}$, is added to the matching sketch data, $W_{k,m}$, as follows:

1. For row $W_h$, corresponding to the selected hash function h that was used to generate $v_{priv}$, set $W_h$ to $W_h + v_{priv}$.

In the case that the client used the $A_{CLIENT\text{-}Hadamard}$ algorithm to generate the selected sketch, then in operation 540, the selected sketch data, vector $v_{Hadamard}$, is added to the matching sketch data $W_{k,m}$ as follows:

1. For row $W_h$, corresponding to the selected hash function h that was used to generate vHadamard, set $W_h = W_h + v_{Hadamard}$.
2. Before determining a count-minimum or count-maximum for the sketch W, convert the rows from Hadamard basis to standard basis:
   $W[i] = \sqrt{m} \cdot H_m W[i]$, $\forall i \in k$, where $H_m$ is a Hadamard matrix of dimension m.

In operation 545, it can be determined whether there are more received sketches in the received data from clients 250 to process for the classification. If so, then method 500 resumes at operation 530. Otherwise method 500 resumes at operation 555, described below with reference to FIG. 5B.

In FIG. 5B, operation 555, learn frequencies job 260 can determine an updated frequency of known terms for a classification using one of count minimum sketch, count median sketch, Hadamard count minimum sketch or Hadamard count median sketch. Learn frequencies job 260 accumulates all uses of each term in a classification using a batch of crowdsourced data. In an embodiment, the usage frequencies of a particular term are aggregated within the sketch, $W_{k,m}$ of the term that was generated or retrieved in operation 540. From the accumulated sketch data, a vector can be generated that represents the total of all sketch data received, e.g. vector V=(195789, 183456, 217046, 207926, 193032) for the term.

In operation 557, learn frequencies job 260 can determine the estimated frequency for a term using vector V. Since a client device selects only a single row of a sketch at random, and each client sketch has k rows in a sketch, the frequency result obtained from vector V will need to be scaled by k to account for the total number of rows k in each sketch. Thus, an estimated frequency for a term using a count median algorithm is given by:

Frequency=$k$*median($V$).

A frequency for a term using a count minimum algorithm is given by:

Frequency=$k$*minimum($V$).

In operation 560, learn frequencies job 260 can access frequencies of known terms in asset catalog 275, and generate asset catalog update 280 using the updated frequency of known terms determined in operation 557. In an embodiment, updating frequency of known terms can be based only on the received data and not upon historic data. In an embodiment, a hybrid update can be used that combines a weighted portion of historic term frequencies with the frequencies of known terms based that are based only on the currently processed received sketch data. Such an embodiment would allow for current trending in frequencies while aging out historic frequency data.

In operation 565, learn frequencies job 260 can optionally store one or more of the sketches generated by term frequency server 130 for known terms in operation 525 of FIG. 5A, above. In an embodiment, learn frequencies job 260 can store, e.g., the sketches of the 10% highest frequency terms so that in subsequent learn frequencies jobs 260 the sketches for high frequency known terms can be looked up rather than recomputed. A percentage of stored sketches for known terms can be determine that balances term frequencies, term frequency persistence (how long a sketch remains high frequency), sketch retrieval times, and sketch computation times.

In operation 570, learn frequencies job 260 can optionally purge at least a portion of previously received sketch data 250, to maintain differential privacy. In an embodiment, purge of some or all previously received sketch data from clients can be performed asynchronously from the transmission of sketch data from any particular client. In an embodiment, learn frequencies job 260 can purge some or all of the currently processed received sketch data from clients to maintain differential privacy.

In operation 575, term frequency server 130 can optionally transmit an updated asset catalog to one or more client devices.

Figure 6:
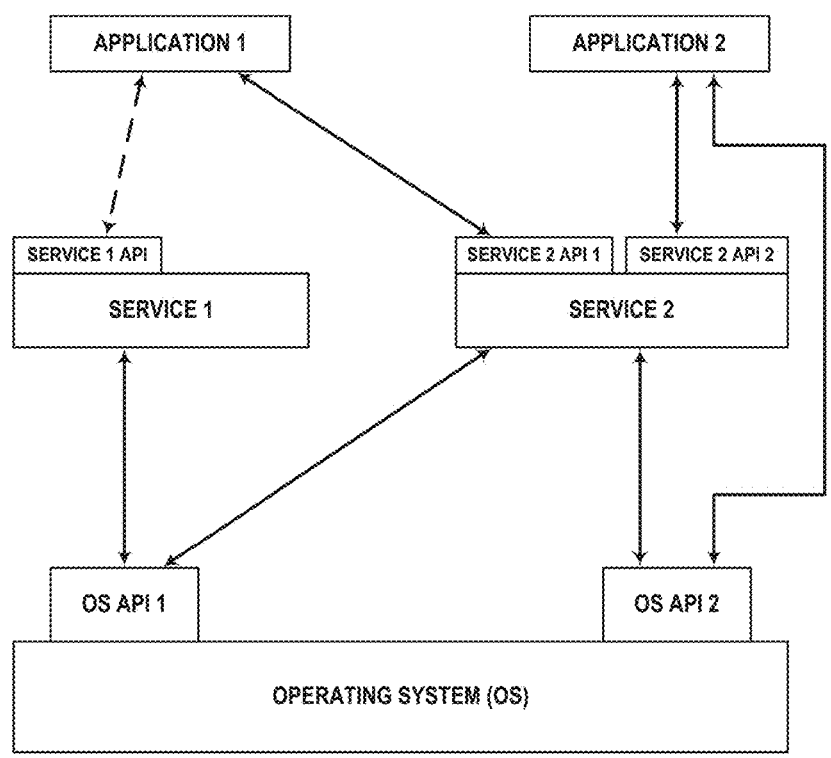
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 7:
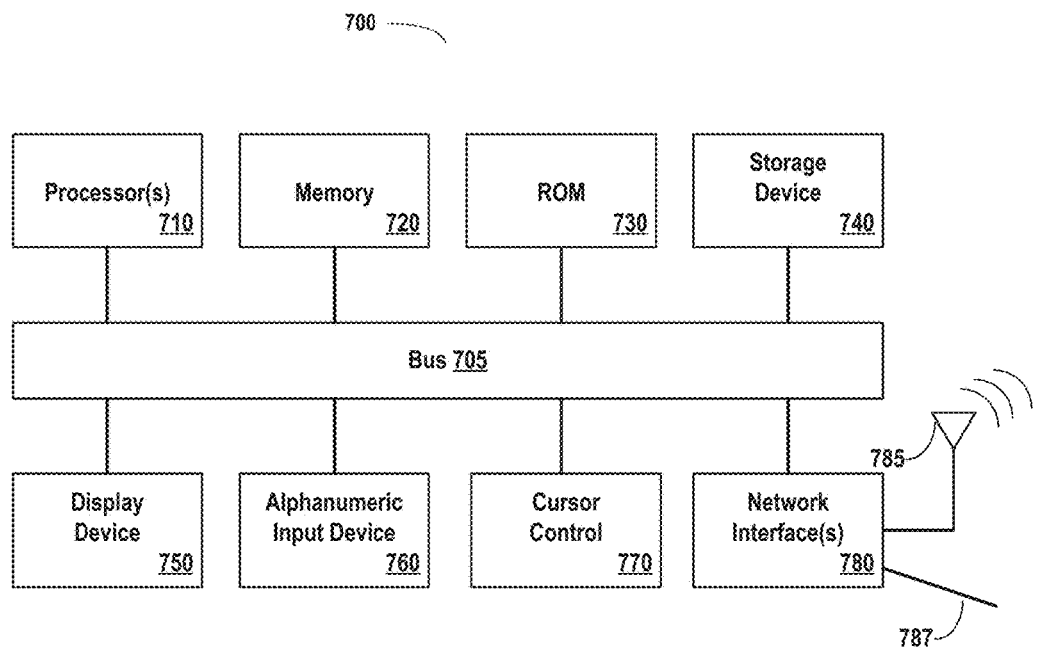
FIG. 7 is a block diagram of one embodiment of a computing system.

FIG. 7 is a block diagram of one embodiment of a computing system 700. The computing system illustrated in FIG. 7 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide the computing device and/or the server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) and/or other static storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a cathode ray tube (CRT) or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 770, such as a touchpad, a mouse, a trackball, or cursor direction keys to communicate direction information and command selections to processor(s) 710 and to control cursor movement on display 750. Computing system 700 may also receive user input from a remote device that is communicatively coupled to computing system 700 via one or more network interfaces 780.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 8:
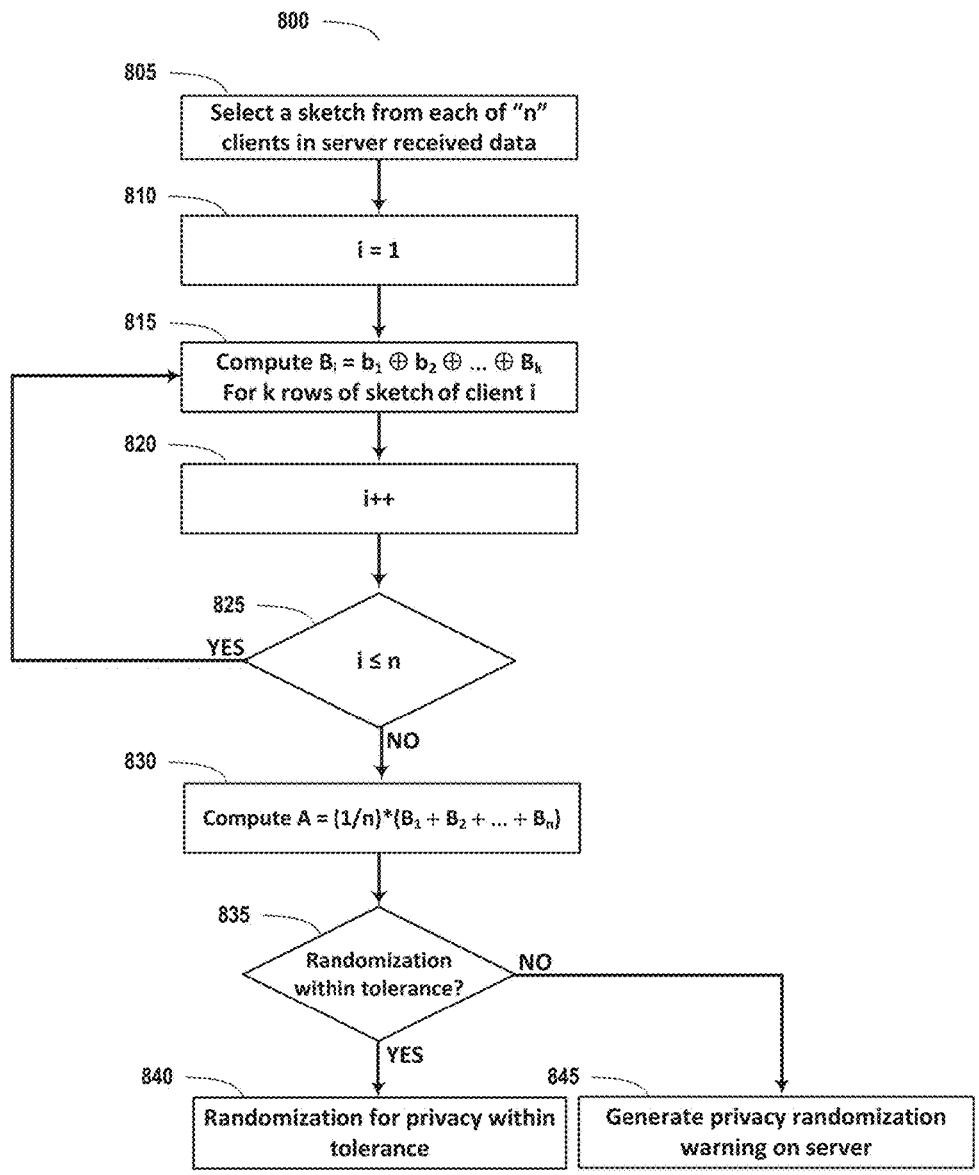
FIG. 8 illustrates a server privacy bit-test to ensure sufficient randomization of received data from crowdsourced clients, according to some embodiments.

FIG. 8 illustrates a server privacy bit-test 800 to ensure sufficient randomization of received data from crowd-sourced clients, according to some embodiments. Maintaining privacy of client device users in a differential privacy environment relies in part upon randomization in algorithms used to implement differential privacy. If randomization is not sufficiently random, then differential privacy may not be sufficiently maintained. The server privacy bit-test tests the randomization of differentially private sketch data received from client devices.

In operation 805, a differentially private sketch can be selected for each of "n" clients represented in the received and de-identified data 250 on new term learning server 130. A bit is generated from the sketch of each client by XORing the 1-bit vector of each row of the sketch for the client.

In operation 810, a loop iterator variable, i, is set to 1.

In operation 815, each bit $b_1 \ldots b_k$ of a row of sketch i, compute:

$$B_i = b_1 \oplus b_2 \oplus \ldots \oplus b_k.$$

In operation 820, increment client counter variable i.

In operation 825, it can be determined whether there are more client sketches to process. If so, then method 800 continues at operation 815. Otherwise, method 800 continues at operation 830.

In operation 830, a sum of bits is computed using all of the $B_i$, i=1 ... n, computed above for one sketch for each client i, of n clients. The sum A is computed as:

$$A = \frac{1}{n} \cdot \sum_{i=1}^{n} B_i$$

In operation 835, a randomization tolerance is computed and it can be determined whether the randomization of clients is within tolerance. In an embodiment, the randomization tolerance can be computed as:

If $$\left| A - \frac{1}{2} \right| \geq \frac{3}{2 \cdot \sqrt{n}} + \left( 1 - \frac{2}{1 + e^\varepsilon} \right)^k$$

then randomization tolerance fails, else randomization tolerance succeeds.

In an embodiment, randomization tolerance can be computed as:

$$A \in \frac{n}{2} \pm \sqrt{n}$$

If $$|A| \in \frac{n}{2} \pm \sqrt{n}$$

then randomization tolerance succeeds, otherwise randomization tolerance fails.

If, in operation 835, randomization tolerance succeeds, then in operation 840, a message can be generated to a user interface of new term learning server 130 indicating that randomization is within tolerance, otherwise in operation 845 and message can be generated to the user interface of new term learning server 130 indicating that randomization is not within tolerance, indicating that measures need to be taken to further ensure client device differential privacy. Measures could include modifying a randomization algorithm, purging more client device data and/or purging client device data more frequently.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method practiced on a set of one or more servers each comprising at least one hardware processor, the method comprising:

receiving a batch of rows of differentially private term sketches comprising differentially private sketches of terms known to the set of one or more servers, the differentially private sketches received from a plurality of client devices;

generating, or retrieving, a differentially private sketch of each of a set of known terms on the set of one or more servers, thereby generating a set of differentially private sketches of known terms;

selecting a row of a differentially private sketch from the batch;

querying, by the set of one or more servers, the set of differentially private sketches of known terms to find a match to the selected row of a differentially private sketch; and adding, by the set of one or more servers, the selected row of the differentially private sketch to the matching differentially private sketch.

2. The method of claim 1, further comprising:
determining a frequency of the term corresponding to the selected sketch.

3. The method of claim 2, further comprising:
updating an asset catalog having frequencies of known terms with the determined frequencies of known terms generated from the received batch of rows of differentially private sketches, thereby generating an updated asset catalog; and
transmitting the updated asset catalog to at least one client device.

4. The method of claim 2, wherein determining the frequency of a known term comprises:
- generating a vector, V, comprising k values, each value obtained from a different one of k rows in the matching differentially private sketch for the term;
- determining a sketch count value, C, wherein C is one of: a median of all values in vector V, or a minimum of all values in vector V; and
- determining the frequency of the term by multiplying C by k.

5. A non-transitory machine readable media storing executable instructions which when executed by a set of one or more servers cause the set to perform a method, the method comprising:
- receiving a batch of rows of differentially private term sketches comprising differentially private sketches of terms known to the set of one or more servers, the differentially private sketches received from a plurality of client devices;
- generating, or retrieving, a differentially private sketch of each of a set of known terms on the set of one or more servers, thereby generating a set of differentially private sketches of known terms;
- selecting a row of a differentially private sketch from the batch;
- querying, by the set of one or more servers, the set of differentially private sketches of known terms to find a match to the selected row of a differentially private sketch; and
- adding, by the set of one or more servers, the selected row of the differentially private sketch to the matching differentially private sketch.

6. The media of claim 5, further comprising:
- determining a frequency of the term corresponding to the selected sketch.

7. The media of claim 6, further comprising:
- updating an asset catalog having frequencies of known terms with the determined frequencies of known terms generated from the received batch of rows of differentially private sketches, thereby generating an updated asset catalog; and
- transmitting the updated asset catalog to at least one client device.

8. The media of claim 6, wherein determining the frequency of a known term comprises:
- generating a vector, V, comprising k values, each value obtained from a different one of k rows in the matching differentially private sketch for the term;
- determining a sketch count value, C, wherein C is one of: a median of all values in vector V, or a minimum of all values in vector V; and
- determining the frequency of the term by multiplying C by k.

* * * * *